United States Patent [19]

Omae et al.

[11] Patent Number: 4,712,052
[45] Date of Patent: Dec. 8, 1987

[54] DIGITAL SERVO-CONTROL SYSTEM

[75] Inventors: Tsutomu Omae, Hitachi; Sanshiro Obara, Ibaraki; Kenji Kubo; Masahiko Watanabe, both of Hitachi, all of Japan

[73] Assignee: Hitachi, Ltd., Tokyo, Japan

[21] Appl. No.: 783,362

[22] Filed: Oct. 3, 1985

[30] Foreign Application Priority Data

Oct. 5, 1984 [JP] Japan ............... 59-208208

[51] Int. Cl.⁴ .............................. G05B 11/32
[52] U.S. Cl. ................... 318/625; 318/573; 318/4; 318/5
[58] Field of Search ............. 318/625, 573, 4–6, 318/7, 594

[56] References Cited

U.S. PATENT DOCUMENTS

| 4,240,016 | 12/1980 | Inaba et al. | 318/562 |
| 4,383,209 | 5/1983 | Lewis | 318/696 |
| 4,415,967 | 11/1983 | Russell | 364/168 |

FOREIGN PATENT DOCUMENTS 0084367 7/1983 European Pat. Off. .
0114362 8/1984 European Pat. Off. .

*Primary Examiner*—William M. Shoop, Jr.
*Assistant Examiner*—Saul M. Bergmann
*Attorney, Agent, or Firm*—Antonelli, Terry & Wands

[57] ABSTRACT

A digital servo-control system used for driving a machine with a plurality of drive shafts having a digital type multi-axis position control unit, provided in common to all of the drive shafts, for computing a torque command value for each drive shaft on the basis of a position detection value detected by a position detector provided for each drive shaft and a position command value for each drive shaft, and torque control units, respectively provided in correspondence to a plurality of motors adapted to drive the respective drive shafts, for controlling output torque of a corresponding motor in accordance with the computed torque command value.

3 Claims, 8 Drawing Figures

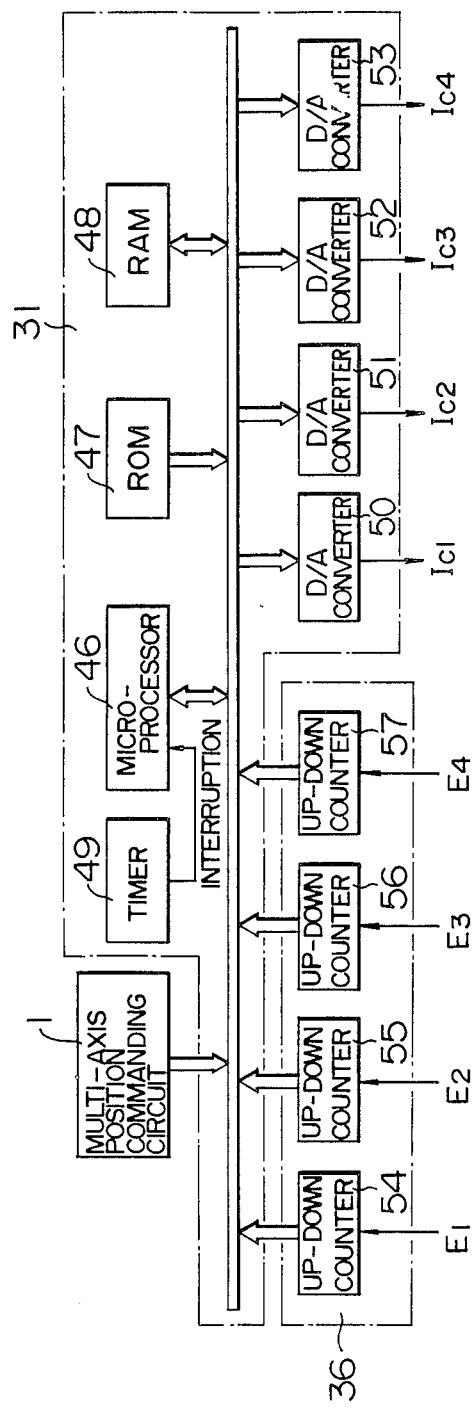
F I G. 2

DIGITAL SERVO-CONTROL SYSTEM

BACKGROUND OF THE INVENTION

1. Field of the Invention

This invention relates to a digital servo-control system suitable for driving a machine with a number of drive shafts such as a robot or a machine tool.

2. Description of the Prior Art

In order to drive a machine with a number of drive shafts such as a robot or a machine tool, a plurality of motors must be controlled simultaneously. Each motor is driven through a servomechanism. In controlling axial positions through a servo system, a microprocessor is typically used as an axial position control means. This technique is described in, for example, "Assembly Robot and Its Technological Problems" by Koichi Sugimoto et al in the Hitachi Review, Vol. 64, No. 12, December 1982, pages 5 to 10.

Incidentally, a number of one-axis servo systems have hitherto been combined to constitute a multi-axis servo system. In recent years, however, demands for high performance and cost reduction have arisen and the aforementioned arrangement has not always been evaluated to be the most profitable arrangement. Accordingly, it has been considered to control a number of shafts by using a multi-axis position control means employed in common to a plurality of servo systems. An example of this type of arrangement will be described briefly.

The multi-axis position control means (microcomputer) receives a position command value for each axis and a position detection value detected for each axis and executes an arithmetic operation to determine a speed command value for each axis. The speed command value for each axis thus determined by the multi-axis position control means is applied to a speed control circuit provided for each axis. The speed control circuit of each axis compares a speed detection value from a speed detector provided for each axis with the speed command value to produce a current command value (torque command value) for each axis. The current command value is applied to a current control circuit. The current control circuit of each axis compares the current command value with a current detection value for a motor of each axis and controls a power converter which supplies electric power to the motor. Thus, position control is executed while controlling current and speed under the application of a voltage to the motor.

The digital servo control system for effecting multi-axis position control described above in brief, however, faces the following problems.

Initially, DC motors and others types of motors such as an induction motors or synchronous motors are used as servomotors at present and hence in multi-axis position controlling, it is sometimes desired to change the type of motor. The type of speed control circuit is usually determined in accordance with the type of motor used. Accordingly, when the motor is exchanged, a servo drive system including the speed control circuit, current control circuit and power converter must also be exchanged. This exchange of the servo drive system is unacceptable from the standpoint of economy. In addition, the speed control circuit is operable in digitized configuration but it is provided for each axis, thereby unduly raising cost.

In the second place, the provision of the speed detector and position detector for each axis also raises cost.

Further, the employment of the speed detector is contrary to a recent technical trend of effecting speed detection with a position signal supplied from the position detector.

SUMMARY OF THE INVENTION

An object of this invention is to provide a digital servo-control system which can assure inexpensive change of various types of motors and easy construction of a multi-axis control system.

By taking advantage of the fact that when constructing a servo system by using various types of motors such as DC motors, induction motors and synchronous motors, the servo system differs only in torque generation mechanisms depending on the types of motors used, but is the same for various types of motors in the stage of executing control arithmetic operations of position and speed to generate a torque command. In view of this fact, in this invention, a means which is responsive to a torque command signal to execute torque control and so forth, is constructed for each of the axes respectively, and a multi-axis position control means executes control arithmetic operations of position and speed for the axes.

According to the invention, a digital servo-control system comprises a plurality of motors for driving a plurality of drive shafts of a machine, respectively, position detection means for detecting a position of each of the plurality of drive shafts and producing a position signal, multi-axis position commanding means for producing a position command signal for each of the plurality of drive shafts, digital type multi-axis position control means for receiving the position signal and the position command signal and computing a torque command value for each drive shaft on the basis of a position detection value and a position command value to produce a torque command signal, and torque control means, provided in correspondence to each of the plurality of motors, for receiving the torque command signal and controlling output torque of a corresponding motor in accordance with a torque command value contained in the torque command signal.

The multi-axis position control means generates a torque command signal for each drive shaft through execution of control arithmetic operations of position and speed of each drive shaft by using a position command value and a torque command value, and is used in common for the respective drive shafts in place of the functional stages for generating torque command signals which can be used in common for control circuits of different types of motors, which stages are included in speed control circuits for individual drive shafts respectively in the conventional multi-axis control system. In this manner, the conventional functional stages is centralized into the single functional stage according to the invention to reduce cost of hardware.

When changing the type of motor, the torque control means is required to be exchanged in accordance with the type of motor used. But the functional centralization of the multi-axis position control means makes the construction of the torque control means simpler than that of the conventional speed control circuit and changing the type of motor can therefore be accomplished inexpensively.

The multi-axis position control means executes the speed control arithmetic operations inclusive of speed detection of a drive shaft on the basis of a position detection value for the drive shaft. This eliminates necessity of providing a speed detector for each axis and meets the recent technical trend of effecting speed detection with a position detection value.

Since in accordance with the invention only the torque control means is provided for each axis and the position and speed controlling is centralized for multiple axes, the construction of the system with a multi-axis servomechanism can be simplified and adaptability to changing the type of motor can be improved.

BRIEF DESCRIPTION OF THE DRAWINGS

These and other objects and advantages of the present invention will become apparent by reference to the following description and accompanying drawings wherein:

FIG. 2 is a block diagram schematically showing examples of a multi-axis position control unit and a multi-axis position detection unit;

DESCRIPTION OF THE PREFERRED EMBODIMENTS

Figure 1:
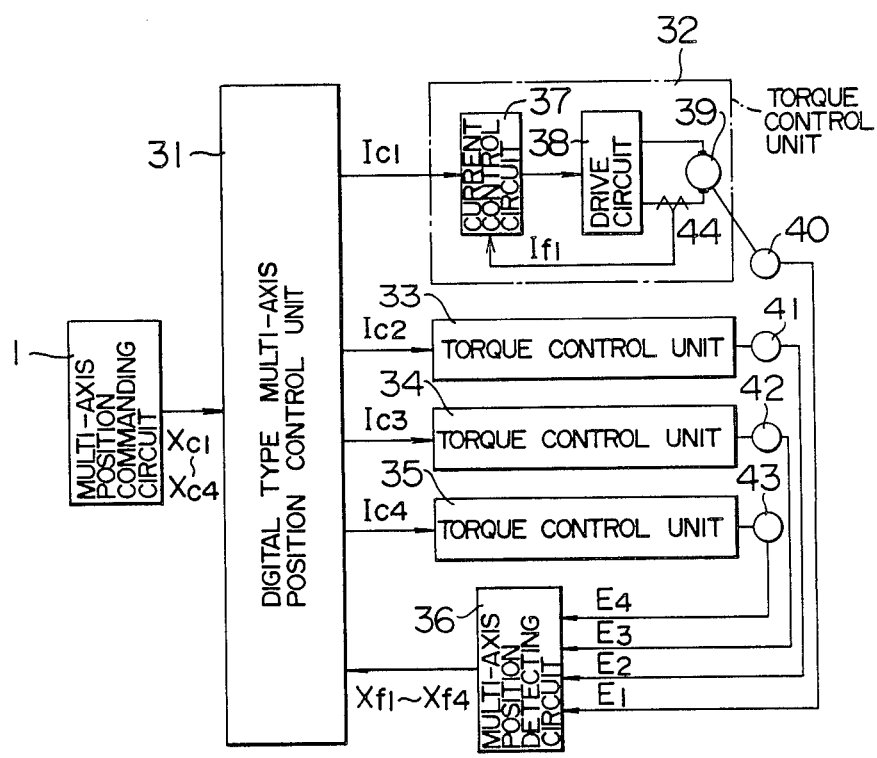
FIG. 1 is a block diagram showing the construction of an embodiment of the invention.

FIG. 1 illustrates a digital servo-control system according to an embodiment of the invention as exemplified for four-axis controlling.

Figure 3:
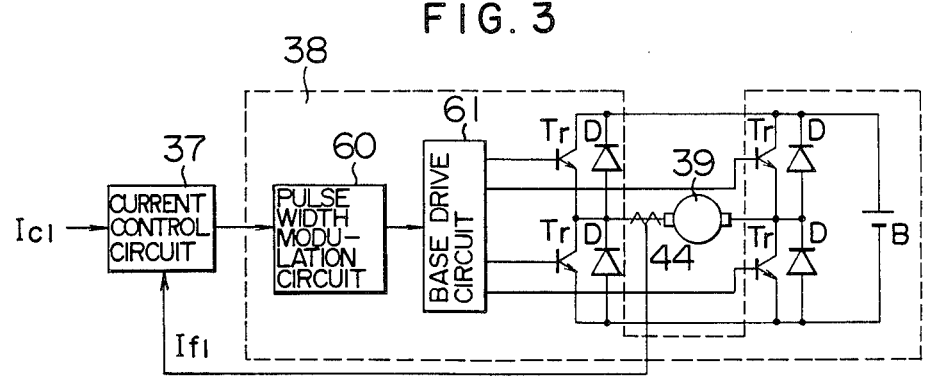
FIG. 3 is a circuit diagram showing an example of a torque control unit shown in FIG. 1.

Referring to FIG. 1, a multi-axis position commanding circuit 1 produces position command signals $X_{c1}$ to $X_{c4}$ for four axes which in turn are applied to a digital type multi-axis position control unit 31. A microcomputer is used as the multi-axis position control unit 31. As shown in FIG. 2, the multi-axis position control unit 31 comprises a microprocessor 46, a read-only memory (ROM) 47, a random access memory (RAM) 48, a timer 49 for generating an interruption pulse at a predetermined period, and four digital to analog converters (D/A converters) 50 to 53. Current command signals (torque command signals) $I_{c1}$ to $I_{c4}$ delivered from the multi-axis position control unit 31 are inputted to torque control units 32 to 35. In the case of a DC motor, current flowing through the motor is proportional to torque and the current command signal is equivalent to the torque command signal. The torque control unit 32 comprises a current control circuit 37, a drive circuit 38, a DC motor 39 and a current detector 44. In view of the fact that the drive circuit 38 for the DC motor 39 controls torque of a shaft of the motor 39, this drive circuit 38 is included in the torque control unit in the FIG. 1 embodiment. As shown in FIG. 3, the drive circuit 38 comprises a pulse width modulation circuit 60, a base drive circuit 61 for generating base signals for four transistors $T_r$, diodes D connected in antiparallel relationship with the respective transistors $T_r$, and a DC power source B. An incremental encoder 40 is mechanically coupled to the DC motor 39. DC motors associated with the torque control units 33 to 35 are likewise coupled with encoders 41 to 43, respectively. Output pulses $E_1$ to $E_4$ of the encoders 40 to 43 are inputted to a multi-axis position detecting unit 36. The multi-axis position detecting unit 36 comprises, as shown in FIG. 2, four up-down counters 54 to 57 which count the output pulses $E_1$ to $E_4$ of encoders 40 to 43, respectively.

Figure 4:
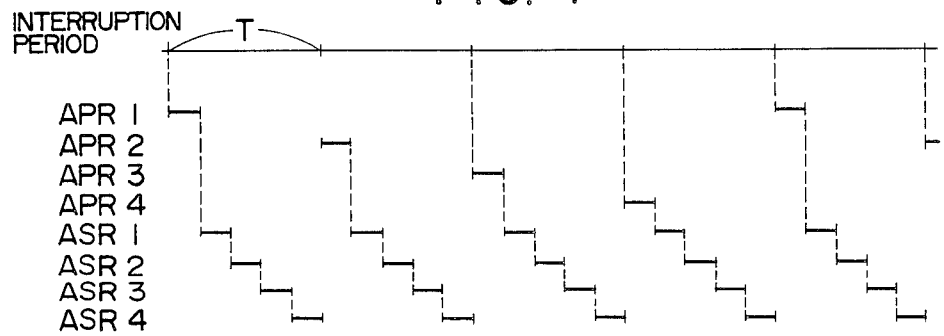
FIG. 4 is a time chart for explaining the operation of a microprocessor shown in FIG. 1.
Figure 6:
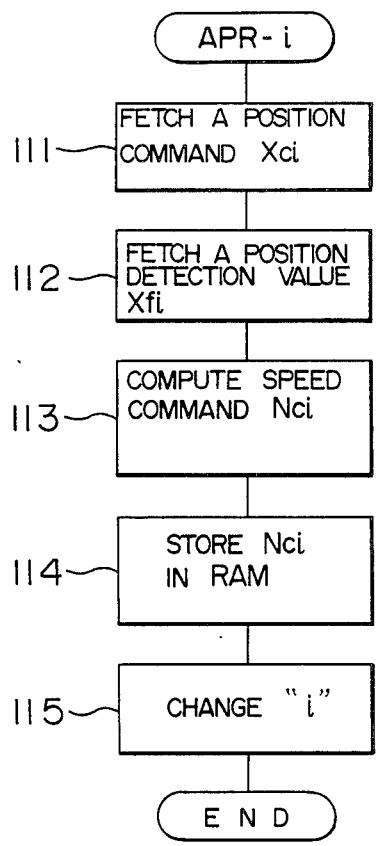
Figure 7:
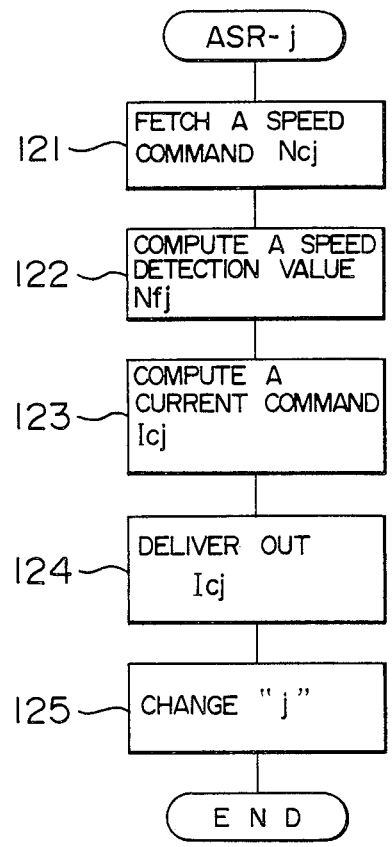

The operation of the digital servo-control system will now be described with reference to a time chart shown in FIG. 4 and flow charts shown in FIGS. 5 to 7.

Figure 5:
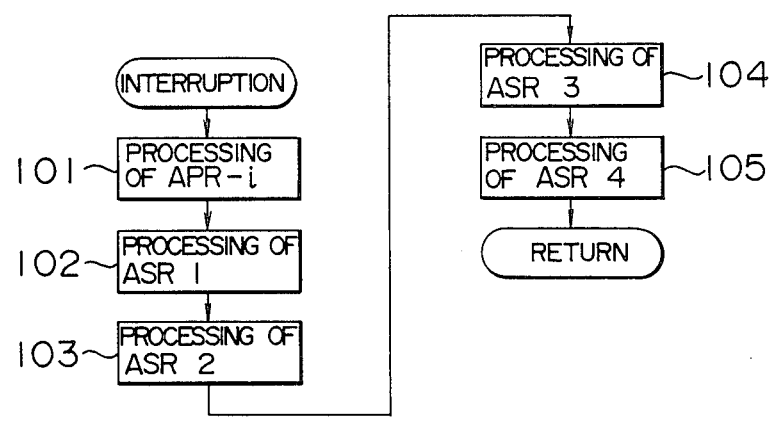
FIGS. 5 to 7 are flow charts for explaining the operation of the microprocessor.

Each time the timer 49 generates an interruption pulse at a predetermined period T (for example, $1_{mS}$), the microcomputer 46 executes processings as shown in FIG. 5. Firstly, axial position control for i-th axis APR-i is executed in block 101, where i denotes any one of numerals 1 to 4 assigned to the respective axes. For example, when i=1, position control APR is executed for the first axis. Contents of processing in block 101 are detailed in FIG. 6. The microprocessor 46 fetches a position command $X_{ci}$ for i-th axis from the multi-axis position commanding circuit 1 in block 111. Subsequently, the microprocessor 46 fetches a position detection value $X_{fi}$ from the i-th counter (for example, counter 54 for i=1 or counter 55 for i=2) of the multi-axis position detecting unit 36 in block 112. In block 113, a speed command value $N_{ci}$ is computed on the basis of the position command signal $X_{ci}$ and the position detection value $X_{fi}$. Where a proportional compensation is used for compensating the position control, the speed command value $N_{ci}$ is computed by using a proportional gain $K_{pi}$ pursuant to the following equations:

$$N_{ci} = K_{pi}(X_{ci} - X_{fi}) \qquad (1)$$

The thus determined speed command value $N_{ci}$ for i-th axis is stored in a predetermined address of the RAM 48 in block 114. Thereafter, 1 (one) is added to "i" to change designation of axis. If the sum is 5, "i" recovers 1 (one). Changing "i" is executed in block 115. When the position control APR-i consisting of processings in blocks 111 to 115 ends, speed control processings in blocks 102 to 105 shown in FIG. 5 are executed. Blocks 102 to 105 are for different axes but contents of processing are the same in each of these blocks and executed in accordance with a flow chart of FIG. 7. Suffix "j" in FIG. 7 denotes an axis number. Firstly, the microprocessor 46 fetches a speed command value $N_{cj}$ for j-th axis stored in a predetermined address of the RAM 48 in block 121. Subsequently, in block 122, a speed detection value $N_{fj}$ is computed. For computation, a current position detection value $X_{fj}(t)$ is fetched from a counter for j-th axis, for example, counter 54 for the first axis, and subjected to subtraction with respect to a position detection value $X_{fj}(t-T)$ which has been fetched during the previous processing in block 122. The subtraction follows equation (2) as below.

$$N_{fj} = \frac{X_{fj}(t) - X_{fj}(t-T)}{T} \qquad (2)$$

where T represents the constant interruption period.

After completion of this arithmetic operation, $X_{fj}(t)$ which is to be used for the next speed detection, is stored in the area of RAM 48 which has previously been occupied by $X_{fj}(t-T)$. Processings until this point are executed in block 122.

A current command value $I_{cj}$ is computed on the basis of the thus obtained speed command value $N_{cj}$ and speed detection value $N_{fj}$ in block 123. Where a gain compensation, for example, is used as a compensation factor for the speed controlling, the following equation indicates the current command value:

$$I_{cj} = K_{sj}(N_{cj} - N_{fj}) \quad (3)$$

where $K_{sj}$ represents a proportional gain.

The thus obtained current command value $I_{cj}$ is applied to either one of the D/A converters 50 to 53 (block 124). If processing is in progress in block 102, then the D/A converter 50 will be selected and an analog current command value $I_{c1}$ is delivered out of the converter 50. This current command value $I_{c1}$ is applied to the torque control unit 32, particularly, to its current control circuit 37 as shown in FIG. 3. Then, the four transistors $T_r$ are operated by the current command value $I_{c1}$ through the pulse width modulation circuit 60 and base drive circuit 61 so as to supply a desired current to the DC motor 39. An actual current flowing through the motor 39 is detected by the current detector 44 and becomes a feedback signal $I_{f1}$ for current controlling. The encoder 40 coupled to the DC motor 39 generates pulses in accordance with a rotation angle of the motor 39. These pulses are counted by the counter 54 and used to obtain a position detection value $X_{f1}$ and a speed detection value $N_{f1}$. In this manner, a moving object driven by the DC motor 39 associated with the first axis is controlled for its position.

After executing the speed control arithmetic operation processing ASR 1 for the first axis, the microprocessor 46 continues to sequentially execute speed control arithmetic operation processings ASR 2 to ASR 4 for the second to fourth axis (block 125) to thereby sequentially set current command values $I_{c2}$ to $I_{c4}$ for these axes in the D/A converters 51 to 53. In this manner, during the interruption period T, the microprocessor 46 executes a position control arithmetic operation APR-i for one specified axis and speed control arithmetic operations ASR-j for all the axes, as shown in a time chart of FIG. 4.

As described above, the FIG. 1 embodiment provides a simplified and inexpensive arrangement which can control position and speed of a plurality of axes.

Figure 8:
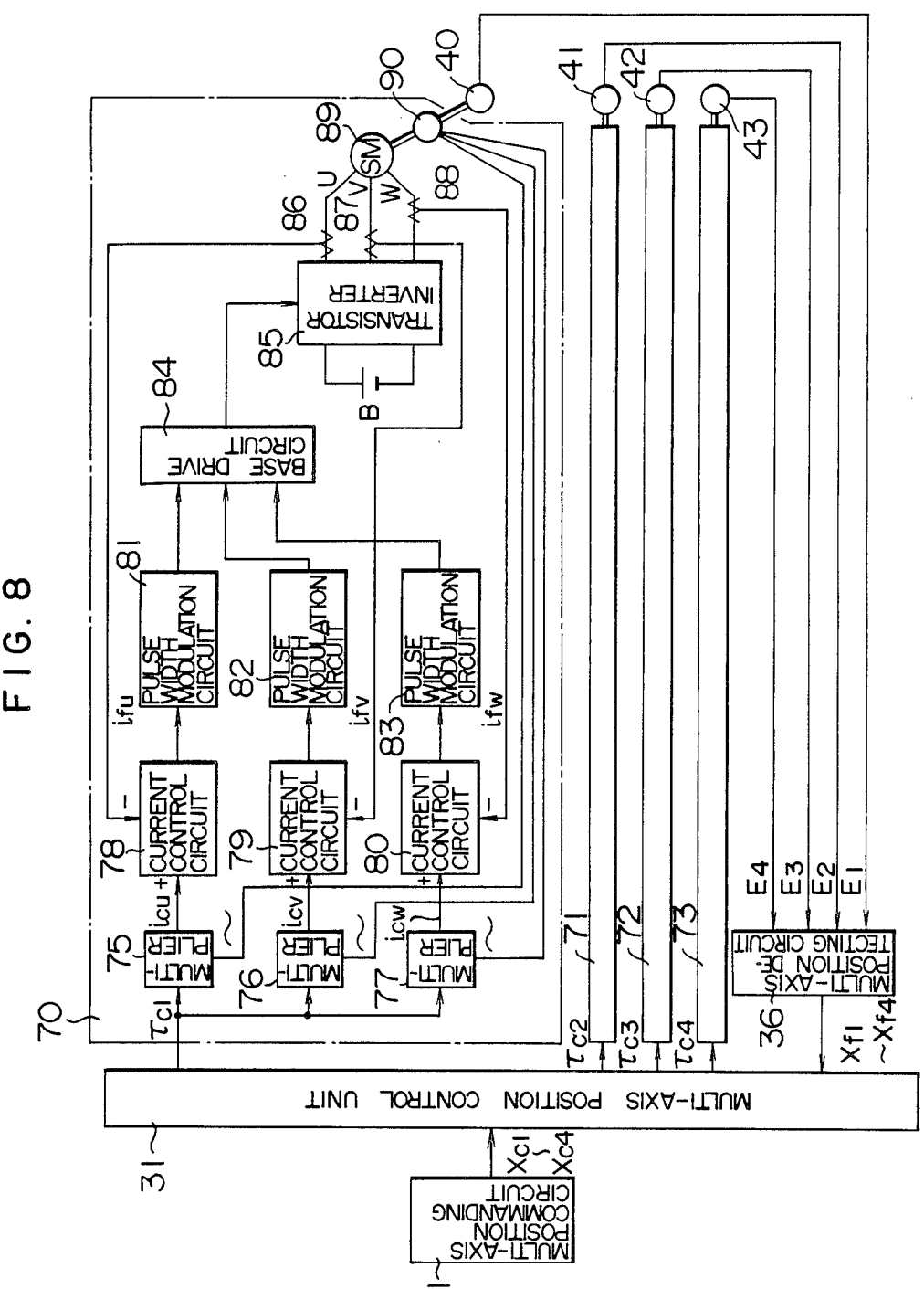
FIG. 8 is a block diagram showing the construction of another embodiment of the invention.

FIG. 8 shows another embodiment of the invention. This embodiment employs synchronous motors and differs from the FIG. 1 embodiment in that torque control units 70 to 73 substitute for the torque control units 32 to 35. The multi-axis position control unit 31 uses, like FIG. 2, position command values $X_{c1}$ to $X_{c4}$ from the multi-axis position commanding circuit 1 and position detection values $X_{f1}$ to $X_{f4}$ from the multi-axis position detecting unit 36 so as to compute torque commands $\tau_{c1}$ to $\tau_{c4}$ for the four axes and supplies the computed torque commands to the torque control units 70 to 73. In the torque control unit 70, multipliers 75 to 77 multiply the received torque command $\tau_{c1}$ by a three-phase sine-wave signal from a magnetic pole piece position detector 90 to produce current command signals $i_{cu}$, $i_{cv}$ and $i_{cw}$. The current command signals $i_{cu}$, $i_{cv}$ and $i_{cw}$ take the form of a three-phase sine-wave which is modulated with $\tau_{c1}$. These current command signals $i_{cu}$ to $i_{cw}$ are respectively applied to current control circuits 78 to 80 and compared with current detection values $i_{fu}$ to $i_{fw}$ detected by current detectors 86 to 88 for U to V phases. Subsequently, as well known in the art, comparison output signals from the current control circuits 78 to 80 operate a three-phase transistor inverter 85 through pulse width modulation circuits 81 to 83 and a base drive circuit 84. As a result, a three-phase current for generating torque corresponding to $\tau_{c1}$ is passed through a synchronous motor 89. The remaining torque control units 71 to 73 execute similar operations so that the corresponding motors generate amounts of torque equivalent to $\tau_{c2}$ to $\tau_{c4}$.

The motors rotate while generating such amounts of torque and the encoders 40 to 43 detect their rotary positions to provide position detection values $X_{f1}$ to $X_{f4}$ which are fetched by the multi-axis position control unit 31 through the multi-axis position detecting unit 36.

By repeating the above operations, positioning to meet the target position commands $X_{c1}$ to $X_{c4}$ can be ensured.

As described above, the FIG. 8 embodiment can use the control unit for DC motors of the FIG. 1 embodiment by exchanging only the torque control units including the synchronous motors. In general, it is therefore possible to reduce cost of applying the control unit according to the invention to different equipments.

Although in the foregoing embodiments the controlling of rotary positions of motors has been described, position controlling of a moving object such as a machine tool table driven by a motor may be effected in a similar manner. The DC motor and the synchronous motor have been exemplified for description but an induction motor may be controlled with an arrangement similar to that described above by using, for example, vector control wherein torque is generated in proportion to a torque command. Further, the previously described arrangement may also be applied to an oil-pressure motor by using a different type of torque generator.

Moreover, although in the foregoing embodiments the speed detection value has been computed from a change in position detection values, the invention may obviously be applicable to other types of servo-control in which a special circuit or a speed detector is used for speed detection.

While particular embodiments of the invention have been shown and described, it will be obvious to those skilled in the art that various changes and modifications may be made without departing from the present invention in its broader aspect.

We claim:

1. A digital servo-control system comprising:
a plurality of motors for driving a plurality of drive shafts of a machine, respectively;
position detection means for detecting a position of each of said plurality of drive shafts and producing a position signal;
multi-axis position commanding means for producing a position command signal indicative of a position command value for each of said plurality of drive shafts;
digital type multi-axis position control means for receiving said position signal and said position command signal, for computing a torque command value for each drive shaft on the basis of a position detection value contained in said position signal and said position command value and for producing a torque command signal; and
torque control means, provided in correspondence with each of said plurality of motors, for receiving said torque command signal and controlling an output torque of a corresponding motor in accordance with said torque command value contained in said torque command signal.

2. A digital servo-control system according to claim 1 wherein said digital type multi-axis position control means computes a speed command value for each drive shaft on the basis of said position detection value and said position command value, detects a speed value of each drive shaft from a change in said position detection value within a predetermined time interval, and computes said torque command value on the basis of the speed command value and a speed detection value.

3. A digital servo-control system according to claim 1, wherein said digital type multi-axis position control means sequentially reads said position detection value and said position command value for each drive shaft at certain times, computes a speed command value based on said position detection value and said position command value and stores said computed speed command value, reads position detection values for all of said drive shafts, computes a speed detection value for each drive shaft on the basis of the position detection value read out at a first time and a position detection value read out at a preceding time, and computes said torque command value on the basis of said speed detection value and said stored speed command value.

* * * * *